United States Patent [19]

Gessler et al.

[11] 4,132,698

[45] Jan. 2, 1979

[54] ELASTOMERIC THERMOPLASTICS

[75] Inventors: Albert M. Gessler, Cranford; Edward N. Kresge, Watchung, both of N.J.

[73] Assignee: Exxon Research & Engineering Co., Florham Park, N.J.

[21] Appl. No.: 770,456

[22] Filed: Feb. 22, 1977

Related U.S. Application Data

[63] Continuation-in-part of Ser. No. 604,210, Mar. 20, 1974, abandoned.

[51] Int. Cl.$^2$ ................................................ C08K 5/01
[52] U.S. Cl. .......................... 260/33.6 AQ; 260/42.46; 260/42.47; 260/897 A
[58] Field of Search .................... 260/33.6 AQ, 897 A

[56] References Cited

U.S. PATENT DOCUMENTS

| | | | |
|---|---|---|---|
| 3,835,201 | 9/1974 | Fischer | 260/897 A |
| 3,882,197 | 5/1975 | Fritz et al. | 260/897 A |
| 3,919,358 | 11/1975 | Batiuk et al. | 260/897 A |

OTHER PUBLICATIONS

Morton–Rubber Technology (2nd ed.) (Van Nostrand) (N.Y.) (1973), pp. 236–241.
Rubber World–Materials & Compounding Ingredients for Rubber (Bill Publications (N.Y.) (1968), pp. 255–257.

*Primary Examiner*—Lewis T. Jacobs
*Attorney, Agent, or Firm*—H. E. Naylor; J. J. Mahon

[57] ABSTRACT

Non-homogeneous, unvulcanized, paintable elastomeric thermoplastics suitable for use as injection molded automotive decorative and structural parts have been developed. These elastomeric thermoplastic compositions are comprised of a highly crystalline polyolefin, such as polypropylene, a noncrystalline or semi-crystalline elastomer and a plasticizer such as a hydrocarbon oil.

23 Claims, No Drawings

ELASTOMERIC THERMOPLASTICS

CROSS-REFERENCE OF RELATED APPLICATIONS

This is a continuation-in-part of U.S. application Ser. No. 604,210 filed Mar. 20, 1974 now abandoned.

BACKGROUND OF THE INVENTION

Elastomeric thermoplastics are well known in the art. For example, U.S. Pat. No. 3,758,643 teaches the preparation of such a blend by admixing a partially cured ethylene propylene copolymer or ethylene propylene terpolymer with polypropylene. Blends of monoolefin copolymer rubber, such as ethylene propylene copolymers having a high viscosity at low shear rate, with polyolefin resins, such as polypropylene are also known in the art. See U.S. Pat. No. 3,835,201.

Such elastomeric thermoplastic blends are used to produce molded or extruded articles, such as automotive decorative and structural parts, which required both the hot processing properties of a plastic and the cold mechanical properties of a vulcanized elastomer. It is also desirable that such articles be paintable. See U.S. Pat. No. 3,873,348 which discloses a paintable cured thermoplastic composition.

In order to achieve sufficient melt flow properties for processing, such elastomeric thermoplastics for molding and extruding purposes have generally been limited to low molecular weight materials obtained either directly through polymerization or indirectly through the breakdown of higher molecular weight materials during processing.

The present invention permits the use of high molecular weight elastomeric materials without polymer breakdown by incorporating therein a plasticizer such as a hydrocarbon oil. Processing as well as mechanical properties of the resulting blends have also been improved in the present invention by use of carbon black having high reinforcing capacity and low aggregate structure.

SUMMARY OF THE INVENTION

It has surprisingly been found that elastomeric thermoplastic blends of two discrete phases can be prepared having superior physical as well as processing properties. These blends are comprised of (a) one or more crystalline or semi-crystalline elastomers such as copolymers of ethylene and $C_3$ to $C_{10}$ higher alpha olefins, (b) one or more crystalline polyolefins such as polypropylene, (c) a plasticizer such as naphthenic and paraffinic oil, and optionally (d) a carbon black having high reinforcing capacity and low aggregate structure.

Proper selection of the resin phase polymer and the elastomer phase polymer is critical to the present invention. Certain compatability and rheological properties are required of both the resin and the elastomer in order to achieve the required two phase morphology.

The thermoplastics of the instant invention are useful for molded and extruded articles such as injection molded automotive decorative and structural parts.

DETAILED DESCRIPTION

Crystalline polyolefin resins having a crystallinity of more than 25 weight percent suitable for use in the instant invention are those high molecular weight resins prepared by polymerizing such olefins as ethylene, propylene, butene-1, pentene-1, 4-methyl-pentene, etc. Preferred is polypropylene having less than about 12 weight % soluble polymer in boiling heptane. Crystalline block copolymers of ethylene and propylene can also be used. Included among the polyolefin resins are the higher alpha olefin modified polyethylenes and polypropylenes.

Proper selection of both the resin phase and elastomer phase is critical to the present invention and certain compatability and rheological properties are required of both the resin and the elastomer in order to achieve the required interlocking two phase morphology.

Regarding the compatability requirements, the resin and elastomer selected for blending must be different enough in composition that the polymers are non-homogeneous at a temperature at which the materials are used. If the phases are non-homogeneous there will be practically no change in the glass transition temperature of either the resin or the elastomer between the blended and unblended states. Glass transition temperatures are conveniently identified by either differential scanning colorimetry (DSC) or dynamic mechanical analysis. Relatively minor differences in composition are often sufficient for useful pairs of resins and elastomers. For example EPDM and polypropylene differ only in the frequency of methyl group placement on the polymer chain and show no substantial displacement of the glass transition temperature of either polymer by DSC.

Preferably the resin is chosen first wherein its rheology is such that it has a viscosity that gives adequate processing in typical thermoplastic processing operations such as extrusion or injection molding. The viscosity of the elastomer phase is selected such that, under the conditions of temperature and shear rate of mixing, it has a viscosity higher than the viscosity of the resin under the same conditions. The viscosities can be determined by using a capillary viscometer. See Viscosity and Flow Measurement, J. R. Van Wazer et al., Interscience Publishers, 1963, p. 187 ff.

In practical blending mixers, such as a Banbury mixer, the average shear rates are on the order to $10^2$ sec.$^{-1}$ and mixing temperatures range from 125° C. to 250° C. In selecting the viscosity of the resin and the viscosity of the elastomer for mixing it is desirable to examine the viscosity near these mixing conditions since it is well known that the viscosities of polymers change at different rates with changes in temperature and the polymer may be highly non-Newtonian, i.e., the viscosity changes with the shear rate of the test. A resin useful in this invention may have a viscosity of $1 \times 10^2$ to $1 \times 10^7$ poise at 225° C. at a shear rate of $10^2$ sec.$^{-1}$. More preferably the resin has a viscosity of $5 \times 10^2$ to $10^6$ poise at 225° C. at a shear rate of $10^2$ sec.$^{-1}$. The elastomer selected for use with the resin has a viscosity higher than the viscosity of the resin at the same conditions of shear rate and temperature. Preferably, the viscosity of the elastomer should not be more than $10^3$ times the viscosity of the resin at the same shear rate. For the practice of the instant invention an upper limit to the viscosity of the elastomer is controlled by the type of mixing process used. Elastomers having viscosities in excess of about $10^7$ poise at 225° C. and a shear rate of $10^2$ sec.$^{-1}$ are not of utility.

It will also be noted that highly useful blends are obtained wherein the elastomer contains a fraction of crystallinity. In EPR and EPDM this crystallinity may be derived from long methylene sequences in the polymer chain. In blends containing an elastomer that is semi-crystalline, with a resin and an oil, the amount of crystallinity in the elastomer must be controlled. If the crystallinity is too high, oil will exude from the material on standing, particularly at lower than room temperature. Elastomers suitable for use in the present invention, such as ethylene propylene copolymers, have crystallinity less than about 25 weight percent at 25° C. as measured by X-ray diffraction.

Elastomers suitable for use in the present invention are preferably those gel-free, non-crosslinked elastomers having a number average molecular weight as measured by membrane osmometry of about 25,000 to about 1,000,000 preferably about 50,000 to about 500,000 and most preferably about 75,000 to about 350,000 and, having the above viscosity and crystallinity restrictions. Illustrative examples of such elastomers include, but are not limited to EPR, EPDM, SBR, polybutadiene, polyisoprene, butyl rubber, halobutyl rubber and butadiene/acrylonitrile copolymers. Preferred are EPR, EPDM, SBR and butyl rubber; most preferred is EPDM as extensively defined below.

Ethylene used in practice of this invention as first monomer may typically be purified commercially available ethylene of greater than 99.98 percent purity typically 99.98 percent to 99.999 percent, preferably 99.999 percent. Nonolefinic impurities may be present in the amount of about 0.001 to about 0.02 percent and water present in amount of about 0.0001 to about 0.0005 percent.

The higher alpha olefin, also called a terminal olefin, which may be suitable for use in this invention as a second monomer, is a purified commercially available $C_3$ to $C_{10}$ olefin having a purity of about 99.98 percent to about 99.999 percent, preferably 99.999 percent. Nonolefin impurities may also be present in the amount of about 0.001 to about 0.02 percent and water present in amount of about 0.0001 percent to about 0.0005.

Such higher alpha olefin can be represented by the following formula $R-CH=CH_2$ wherein R is an alkyl or cycloalkyl. Nonlimiting examples of alpha olefins suitable for use in this invention are:

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

Preferred is propylene, i.e., propene.

It will also be evident to those skilled in the art that a third monomer may be incorporated along with the ethylene and higher alpha olefin. The third monomer suitable for use in this invention is a $C_5-C_{14}$ nonconjugated diolefin. Nonlimiting examples of such nonconjugated diolefins include the following:

A. Straight chain acyclic dienes such as: 1,4-hexadiene and 1,6-octadiene.

B. Branched acyclic dienes such as 5-methyl 1,4-hexadienes, 3,7-dimethyl 1,6-octadiene, 3,7-dimethyl 1,7 octadiene, and the mixed isomers of dihydromyrcene, and dihydroocimene.

C. Single ring alicyclic dienes such as 1,4-cyclohexadiene, 1,5-cyclooctadiene and 1,5-cyclododecadiene.

D. Multiring alicyclic fused and bridged ring diene such as: tetrahydroindene, methyl tetrahydroindene, dicyclopentadiene, bicyclo (2,2,1) hepta 2,5-diene, alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene, and 5-cyclohexylidene-2-norbornene.

Preferred is 5-ethylidene-2-norbornene (ENB).

The ethylene/higher alpha olefin copolymers and terpolymers may be prepared by any conventional manner and the preparation of same does not constitute part of the instant invention.

The preferred ethylene/higher alpha olefin copolymer is ethylene propylene rubber herein referred to as EPR. The preferred ethylene/higher alpha olefin terpolymer contains ethylene, propylene, and ENB, said terpolymer being herein referred to as EPDM. Such polymers contain about 30 to 65 mol percent, preferably about 50 to 65 mol percent ethylene and about 35 to 70 mol percent propylene, wherein the terpolymers contain about 20 to 65 mol percent, preferably 50 to 65 mol percent ethylene, about 35 to 80 mole percent propylene, and up to 30 mol percent ENB.

The relationship between crystallinity and ethylene content of the EPR and EPDM copolymers generally varies with the catalyst used to produce such copolymers. This is apparently due to differences in the sequential arrangement of the ethylene and propylene units in the chain and/or compositional heterogeniety among the chains. A controlling feature appears to be crystallinity in regards to oil exudation. Generally those EP copolymers having a crystallinity less than 25 wt. percent as measured by x-ray diffraction will have an ethylene content less than about 65 mol percent.

The expression "butyl rubber" is used in the rubber industry to describe copolymers prepared from a polymerization reaction mixture having therein from 70 to 99.5% by wt. of an isoolefin which has about 4 to 7 carbon atoms, e.g., isobutylene, and about 30 to 0.5% by wt. of a conjugated multiolefin having about 4 to 14 carbon atoms e.g., isoprene. The resulting copolymers contain 85 to 99.5% by wt. of combined isoolefin and about 0.5 to 15% of combined multiolefin. The preparation of butyl rubber is described in U.S. Pat. No. 2,356,128, which is incorporated herein by reference. Halobutyl rubber as used herein includes those butyl rubbers containing chlorine and/or bromine groups.

The preferred carbon blacks employed in the instant invention are those blacks which have high reinforcing capacity and low aggregate structure. Preferred are the high abrasion furnace blacks (HAF), preferably, a low structure high abrasion furnace black (HAF-LS). Blacks suitable for use in the instant invention are these blacks having a particle size of about 100 to about 600Å, preferably about 200 to about 450Å, and a surface area of about 25 to about 150 $m^2/g$, preferably about 40 to about 100 $m^2/g$.

The high reinforcing blacks used in the practice of the present invention generally give a product with improved physical properties over those products prepared with low reinforcing blacks. That is, such physical properties as extensibility, tensile product and heat distortion are improved by the use of high reinforcing blacks. To obtain a blend of this invention with improved processing properties as judged by spiral flow, it is necessary to use a low structure black. Therefore, it has surprisingly been found that not only can the physical properties of the blend of the instant invention be improved but also the processing properties of such a blend can be improved by incorporating therein a black having both high reinforcing properties as well as having low structure such as HAF-LS.

It is also a feature of this invention that when an HAF-LS black is incorporated into the instant blends, a higher bound rubber content is obtained, as opposed to similar blends incorporating the same amount of a general purpose furnace black (GPF) or any other conventionally used carbon black. Higher bound rubber content gives more carbon-polymer interaction, for example, more carbon-polymer bonding. This is desirable because it leads to enhanced rubber-like properties, that is, properties resembling those of partially vulcanized rubber. See A. M. Gessler, Rubber Age, 101, 55 (1969) incorporated herein by reference.

It has also surprisingly been found that HAF-LS blacks rather than other conventional blacks such as GPF blacks are more readily blended with the blends of the instant invention. This is surprising owing to the fact that it is generally accepted by those of ordinary skill in the art that it is easier to blend carbon black with an elastomer when the black particle is large and the black structure is high. Thus, it would be assumed by those with ordinary skill in the art that a GPF black rather than an HAF-LS black would blend more readily with the blends of the instant invention. It will be noted that this blending advantage of HAF-LS black occurs at all black concentrations above 35 php, regardless of the ethylene propylene copolymer or terpolymer used.

An important aspect of the blends of the instant invention is their paintability by conventional methods regardless of the use of oil for plasticization. Ordinarily, oil would not be blended with crystalline polyolefins such as polyethylene and polypropylene, owing to the fact that when oil is blended with such polyolefins above the melting point of the polyolefin, the oil "bleeds" to the surface on recrystallization. The instant invention gives a product whose surface is oil free and paintable by conventional methods. One such method suitable for use for painting the elastomeric thermoplastics of the instant invention is to clean the molded parts of the instant invention by either wiping with a solvent or power washing with a 1.5% solution of Ridoline 72 a metal cleaning detergent formulation sold by Amchem Products, Inc. followed by several rinses. The last rinse is with deionized water to remove all traces of dirt, moisture, oil, fingerprints, release agents, plasticizers, etc. The molded parts are then dried and treated for coating adhesion either with a proprietary material produced by Seibert Oxiderm (AP1006) which contains a chlorinated polyolefin, or by ultraviolet surface treatment.

Following this surface treatment the parts are primed with either a lacquer primer such as Durethane, Lacquer Primer 32906 or an enamel primer such as Durethane enamel primer 33104 or 33198. Although these primers are not essential, they are commonly used in production for masking the black substrate. The prime surface is baked for about 20 minutes at about 240° F. and then top coated with either PPG's series (flexible polyurethane) or DuPont's Dexlar series (flexible acrylic enamels). The top coated surface is then baked for about 30 to about 40 minutes at about 250° F. It is preferred that the primer be applied in two coats to give a primer coat thickness of at least 0.8 mils and the top coat applied in three coats to give a top coat thickness of at least 1.8 mils.

The elastomeric thermoplastics of the instant invention are also paintable by conventional electrostatic paint application methods owing to their acceptable volume resistivity. At 31% black, based on the total weight of the blend plus black, the volume resistivity is $10^{-7}$ ohm cm. This is an acceptable resistivity for conventional electrostatic paint application methods.

It is sometimes desirable that very high molecular weight ethylene-propylene copolymers or terpolymers be used in the blends of the present invention. These high molecular weight EP polymers are useful for exterior automotive parts that require the strength, resilience, toughness, etc., which would ordinarily only be obtainable through the use of a vulcanized rubber. Such high molecular weight polymers were heretofore unsatisfactory owing to the fact that their viscosity and rheological properties were unsuitable for yielding the good processing or hot flow properties needed to assure proper injection molding of such blends.

It has surprisingly been found herein that when about 5 to 150 php, preferably about 5 to 100 php, and more preferably about 10 to 80 php (based on 100 parts of EP copolymer) of a hydrocarbon based oil is incorporated into high molecular weight EPDM/crystalline polyolefin blends, said blends are more readily injection molded owing to their improved viscosity and rheological properties. During the blending procedure a substantial portion of the oil must be uniformly dispersed in the elastomeric phase prior to blending with the crystalline polyolefin. Hydrocarbon based oils suitable for use in the present invention include, but are not limited to rubber process oils which are either aromatic, naphthenic or paraffinic in nature.

The use of oil in the present invention is therefore advantageous in various ways. One is that it removes the viscosity limitation which had previously been associated with obtaining satisfactory processing behavior of the elastomeric thermoplastic, thus permitting the use of high molecular weight EP co- and/or terpolymers with structural properties needed for various products such as exterior automotive parts. Another is that it substitutes oil for polymer breakdown as a means for adjusting viscosity, thus giving an economic advantage. It has been found that the use of oil with a high molecular weight EP co- and/or terpolymer when blended with a crystalline polyolefin resin as taught in the present invention gives a product with improved physical properties such as improved resilience and significantly enhanced extensibility, regardless of the type carbon black used. But it will be noted that such properties are maximized when the carbon black is an HAF-LS black as previously described.

It will be noted that when the aforementioned hydrocarbon oils are used in the instant invention, any conventional filler may be used, although the preferred filler is carbon black and the most preferred is a carbon black having high reinforcing capacity and low aggregate structure.

Nonlimiting examples of nonblack fillers suitable for use in the instant invention when a hydrocarbon oil is used include inorganic inert materials and organic coupling agents. Illustrative of such inorganic inert materials are ground and precipitated calcium carbonate; standard, delaminated, calcined, and hydrated Kaolin clays; precipitated, hydrated silicas; and silicates, especially calcium and magnesium silicates. Illustrative of the organic coupling agents suitable for use in the instant invention include the halo-silanes, titanates, etc.

Nonlimiting examples of carbon blacks suitable for use in the instant invention when a hydrocarbon oil is used include the channel blacks such as MPC and CC; the furnace blacks such as SRF, HMF, CF, FF, HAF, ISAF and SAF; and the thermal blacks such as MT and FT.

The unvulcanized elastomeric thermoplastic blends of the present invention generally contain about 85 to about 30 parts, preferably about 80 to about 50 parts of oil-containing ethylene co- and/or terpolymer, and about 15 to about 70 parts, preferably about 20 to about 50 parts of crystalline polyolefin. The crystalline polyolefins may be a single homopolymer or a mixture of crystalline polyolefins, e.g., polypropylene or a 50/50 blend of polypropylene and polyethylene.

Suitable amounts of HAF-LS black when incorporated into the blends of the instant invention are preferably about 20 to about 200 parts, more preferably about 30 to about 120 parts, and most preferably about 35 to about 80 parts based on the oil containing ethylene co- and/or terpolymer.

Also within the scope of the present invention is a two phase elastomeric thermoplastic material containing the ethylenic co- and/or terpolymer, the crystalline polyolefin, and the hydrocarbon oils as described previously herein. The surprising and significant features of the instant two phase thermoplastic material is that both phases are continuous and the mean distance between phase boundaries is less than about 1 micron.

Ordinarily thermoplastic blends similar to the instant thermoplastic blends are composed of two phases wherein one phase is continuous and the other phase discontinous and wherein the mean distance between the phase boundaries is more than about 1 micron. By controlling the polymer type, composition, molecular weight and/or the use of plasticizing oils, it has surprisingly been found that a two phase thermoplastic is produced wherein both phases are continuous and wherein the mean distance between the phase boundaries is less than about 1 micron.

The two phase structure of the blends was determined by injection molding a specimen and subsequently extracting the amorphous phase with boiling n-heptane for 24 hours. This removes the soluble elastomeric phase and leaves the crystalline polyolefin phase. After drying, the polyolefin phase was fractured under liquid nitrogen. The fracture surface was then coated with a thin layer of carbon and gold by vacuum deposition and examined with a scanning electron microscope. The nature of the polyolefin phase was clearly distinguishable by this method and the distance between phase boundaries was found to be less than about 1 micron.

The preferred method of blending the compositions of the instant invention is to first prepare a masterbatch of elastomer and filler. This is done by blending the elastomer and filler in a Banbury Mixer. This masterbatch can then be continuously blended with the crystalline polyolefin by feeding both in a continuous mixer such as an extruder. A predetermined amount of masterbatch can also be blended with a predetermined amount of crystalline polyolefin in a Banbury Mixer. It is also within the scope of the present invention that a predetermined amount of filler and elastomer be initially blended in a Banbury and subsequently a predetermined amount of crystalline polyolefin be introduced into said Banbury and blended with the elastomer/black blend. The Banbury blending herein is performed for a period of about 2 to about 15 minutes at a temperature of about 40 to about 220° C. When a hydrocarbon oil is used, it is preferred that said oil be added to the elastomer or elastomer/black masterbatch prior to subsequent blending with the crystalline polyolefin.

This invention and its advantages will be better understood by reference to the following examples.

EXAMPLE 1

Four samples were prepared, each using a different carbon black. Each sample was comprised of 60 parts by weight of EPDM having a Mooney viscosity of 40 at 100° C. and a viscosity of $3.5 \times 10^4$ poise at 100 sec$^{-1}$ and 200° C. as measured by capillary rheometry and containing about 5 wt. % ENB; 40 parts by weight of polypropylene; 45 parts by weight of carbon black; and 0.3 parts of calcium stearate. In each of the four examples, the carbon black and EPDM were first mixed in a Banbury Mixer for 3 minutes under cool conditions (25°–30° C. starting temperature; 110°–121° C. dump temperature). Polypropylene was added to this masterbatch in a second 3 minute mix under hot conditions (150°–160° C. starting temperature, 188°–204° C. dump temperature). The samples were tested and the results are illustrated in Table I below.

TABLE I

Effect of Various Blacks on Properties of EPDM/PP Blends Prepared in Accordance with Example 1

| Experiment No. | 1 | 2 | 3 | 4 |
|---|---|---|---|---|
| Black | GPF | HAF-LS | HAF | HAF-HS |
| Banbury Power, kW | 7.0 | 6.3 | 6.5 | 6.75 |
| Banbury Temp., ° C | 193 | 199 | 199 | 204 |
| Spiral Flow, cm | 10.5 | 14.8 | 10.0 | 9.6 |
| % Bound Rubber | | | | |
|   A-VISTALON Master | 10.5 | 6.9 | 16.2 | 19.9 |
|   B-TPO | 15.3 | 19.3 | 25.3 | 31.3 |
| Hardness (D), max/10 s | 39/33 | 34/26 | 42/30 | 41/31 |
| Bend Recovery, ° | | | | |
|   5 s | 46 | 42 | 43 | 44 |
|   30 s | 38 | 33 | 34 | 34 |
|   1 min. | 34 | 29 | 31 | 31 |
|   5 min. | 30 | 27 | 27 | 28 |
| Flexural Modulus, MPa (psi $\times 10^{-3}$) | 155 (22.5) | 172 (24.9) | 144 (20.9) | 146 (21.2) |
| Tensile Strength, MPa (psi) | 9.6 (1395) | 9.7 (1405) | 10.3 (1495) | 9.5 (1380) |
| % Elongation | 100 | 190 | 140 | 170 |
| % Set at Break | 9.6 | 18.4 | 14.4 | 16.2 |
| Tensile Product MPa based $\times 10^{-2}$ | 9.6 | 18.4 | 14.4 | 16.2 |
|   (psi based $\times 10^{-4}$) | (14.0) | (26.7) | (20.9) | (23.5) |
| Mooney, 71° C (VM*) | 38 | 32 | 48 | 55 |

TABLE I-continued
Effect of Various Blacks on Properties of EPDM/PP Blends Prepared in Accordance with Example 1

| Heat Distortion at 132° C, cm | 1.8 | 1.4 | 1.6 | 1.5 |
|---|---|---|---|---|

*VM refers to EPDM masterbatch.

The surface areas associated with the blacks of Table I are:

| GPF | 28.3 m²/g |
|---|---|
| HAF | 64.1 |
| HAF-HA | 65.7 |
| HAF-LS | 75.2 |

It is clear from Table I that the mechanical properties of the resulting thermoplastic blends are improved when blacks having relatively high reinforcing capacity (finer particle size) are incorporated into said blends. This is evident by comparing such properties as % bound rubber, % elongation, tensile product, and heat distortion of the resulting thermoplastic. Table I also illustrates the fact that spiral flow is maximized by the use of an HAF-LS black.

EXAMPLE 2

Four additional samples were prepared according to Example 1 except that all ingredients were blended together in one operation in a Banbury as opposed to the black being first blended with the EPDM. Table II illustrates that there are some disadvantages of blending all ingredients together in one operation. These disadvantages are believed to result from the poorer dispersion of black in this kind of mix.

TABLE II
Effect of Various Black on Properties of EPDM/PP Blends Prepared in Accordance with Example 2

| Experiment No. | 1 | 2 | 3 | 4 |
|---|---|---|---|---|
| Black | GPF | HAF-LS | HAF | HAF-HS |
| Banbury Power, kW | 7.7 | 7.6 | 7.8 | 7.7 |
| Banbury Temp., ° C | 191 | 185 | 199 | 196 |
| Spiral Flow, cm | 8.6 | 10.8 | 7.8 | 8.2 |
| % Bound Rubber | 16.7 | 21.7 | 24.0 | 26.6 |
| Hardness (D), max/10 s | 44/33 | 44/32 | 45/35 | 45/34 |
| Bend Recovery, ° | | | | |
| 5 s | 48 | 46 | 47 | 48 |
| 30 s | 38 | 36 | 37 | 40 |
| 1 min | 35 | 33 | 33 | 37 |
| 5 min | 31 | 30 | 31 | 33 |
| Flexural Modulus, MPa (psi × $10^{-3}$) | 149 (21.6) | 170 (24.7) | 172 (24.9) | 197 (28.6) |
| Tensile Strength, MPa (psi) | 9.6 (1395) | 9.9 (1450) | 11.9 (1725) | 12.0 (1740) |
| % Elongation | 110 | 215 | 60 | 60 |
| Tensile Product MPa based × $10^{-2}$ (psi) based × $10^{-4}$) | 10.5 (15.3) | 21.3 (31.2) | 7.1 (10.4) | 7.2 (10.4) |
| Heat Distortion at 132° C, cm | 1.9 | 1.5 | 0.8 | 0.8 |

EXAMPLE 3

Two elastomeric thermoplastic samples were prepared, one with a hydrocarbon oil incorporated therein and one without. Both samples contained 30 parts of polypropylene having a melt flow of about 12 g/10 min. (as measured by the procedure set forth in ASTM D 1238). The samples without oil contained 70 parts of EPDM having an $\overline{M}_n$ of about 35,000 and a viscosity of about 3.5 × $10^4$ poise at 100 sec$^{-1}$ at 200° C. The sample with oil contained 70 parts of an equal amount by weight of hydrocarbon oil and EPDM wherein said oil containing EPDM had an $\overline{M}_n$ of about 140,000 and a viscosity of about 3.6 × $10^4$ poise at 100 sec$^{-1}$ and 200° C. The blend containing oil had a viscosity of about 1.6 × $10^4$ poise at 100 sec$^{-1}$ and 200° C. whereas the blend containing no oil had a viscosity of about 4.2 × $10^4$ poise at 100 sec−1 and 200° C.

This example illustrates that while the initial viscosities of the elastomeric phase were nearly identical, when blended with polypropylene, the viscosity of the oil containing blend was significantly lower. Therefore, the thermoplastic sample containing oil is more easily processed than that containing no oil.

All $\overline{M}_n$ measurements were performed by membrane osmometry and all viscosity measurements were performed on an Instron Capillary Viscometer.

EXAMPLE 4

A composition was prepared by blending in a Banbury for 10 minutes the following: (a) 70 parts of an EPDM having an $\overline{M}_n$ of about 140,000 and consisting of 68 wt. % of ethylene, and 5.1 wt. % of ENB; and (b) 30 parts of a polypropylene having a melt flow of about 5g/10 min. On completion of the blending, the blend was extremely difficult to mold in view of its high viscosity. The blended material contained large lumps of unmixed EPDM and was not useful as an elastomeric thermoplastic. This example demonstrates the fact that without the use of a hydrocarbon process oil high molecular weight EPDM's are not useful for preparing elastomeric thermoplastic blends.

EXAMPLE 5

A composition was prepared according to Example 4 except that 75 php (per 100 parts of EPDM) Flexon 876 (a hydrocarbon process oil) was first blended with the EPDM before further blending with polypropylene on a hot Banbury (150°-160° C. starting temperature, 188°-204° C. dump temperature) for 3 minutes.

The properties of the resulting thermoplastic are shown in Table III below.

TABLE III

| Spiral Flow, cm | 31.2 |
|---|---|
| Hardness (D), max/10 sec | 32/24 |
| Bend Recovery, ° 30 sec. | 19.0 |
| 5 min. | 16.0 |
| Flexural Modulus, psi × $10^{-3}$ | 16.0 |
| Tensile strength, psi | 1185 |
| % Elongation | 415 |

TABLE III-continued

| Tensile Product × $10^{-3}$ | 492 |
|---|---|

This example illustrates the need for a hydrocarbon process oil in the preparation of an elastomeric thermoplastic containing a high molecular weight EPDM.

EXAMPLE 6

Elastomeric thermoplastic compositions were prepared using the ingredients set forth in Table IV. The EPDM and filler were first blended in a Banbury under cool conditions as in Example 1. Polypropylene was added and blended with the resulting masterbatch for an additional 3 minutes under hot mixing conditions, as in Example 1. The EPDM used in these experiments had an $\overline{M}_n$ of 140,000 as measured by membrane osmometry, and ethylene content of 68 wt. %, an ENB content of 5.1 wt. %, and 75 parts of Flexon 876 (a hydrocarbon process oil) per 100 parts of elastomers. The polypropylene had a melt flow rate of 5g/10 min. at 230° C. and 2160g.

TABLE IV

| Experiment | 1 | 2 | 3 | (control) 4 |
|---|---|---|---|---|
| EPDM, pts | 70 | 70 | 70 | 70 |
| Polypropylene, pts | 30 | 30 | 30 | 30 |
| Atomite (1), pts | 40 | 100 | | |
| Suprex Clay (2), pts | | | 100 | |
| Sunpar 2280 (3), pts | 20 | | | |
| Banbury mix time (min.) | 10 | 8 | 10 | 8 |
| Shore D Hardness | 30 | 45 | 50 | 32 |
| Tensile Strength, psi | 1350 | 1500 | 1500 | 1500 |
| % Elongation | 180 | 100 | 200 | 490 |

(1) calcium carbonate, <10 microns particle size
(2) hydrated aluminum silicate, ~2 micron particle size
(3) hydrocarbon process oil, paraffinic ASTM D226 Type 101B The above table illustrates the use of nonblack fillers in the instant invention.

EXAMPLE 7

These samples were prepared according to the procedure set forth in Example 1, except the following ingredients were used: 60 parts by weight of EPDM having an $\overline{M}_n$ of about 55,000 containing 5 wt. % ENB and an ethylene content of 60 wt. %; 40 parts by weight, of polypropylene having an Mv of about 70,000; 45 parts by weight of black as indicated in Table V; and 40 php based on 100 parts of EPDM of Sunpar 2280 (a hydrocarbon process oil). The resulting elastomeric thermoplastic samples were tested as before, and the results are illustrated in Table V below.

TABLE V

| Experiment Black | 1 GPF | 2 HAF-LS | 3 HAF-HS |
|---|---|---|---|
| Banbury Power, kW | 5.9 | 5.7 | 6.1 |
| Banbury Temp., °C | 188 | 191 | 199 |
| Spiral Flow, cm | 16.6 | 16.1 | 14.2 |
| % Bound Rubber | | | |
| A - VISTALON Master | 14.1 | 19.1 | 23.4 |
| B - TPO | 20.5 | 41.3 | 43.3 |
| Hardness, max/10 s | 34/27 | 33/26 | 36/27 |
| Bend Recovery, ° | | | |
| 5 s | 29 | 25 | — |
| 30 s | 24 | 20 | — |
| 1 min | 22 | 19 | — |
| 5 min | 19 | 17 | — |
| Flexural Modulus, MPa (psi × $10^{-3}$) | 99 (14.3) | 103 (14.9) | 93 (13.5) |
| Tensile Strength, MPa (psi) | 8.3 (1210) | 8.6 (1245) | 8.9 (1285) |
| % Elongation | 235 | 285 | 310 |
| Tensile Product, MPa based × $10^{-2}$ (psi based × $10^{-3}$) | 19.5 (28.4) | 24.5 (35.5) | 27.6 (39.8) |
| Heat Distortion at 132° C, cm | 1.8 | 1.5 | 1.8 |
| Mooney, 71° C (VM*) | 33 | 25 | 36 |

*VM refers to EPDM masterbatch.

The above table again illustrates the advantages of using a hydrocarbon process oil in the instant invention. It is also evident from the above table that an HAF-LS black gives superior results over the other conventional blacks even when a hydrocarbon process oil is used.

EXAMPLE 8

Two elastomeric thermoplastic compositions were prepared from a relatively low molecular weight EPDM. One composition contained a hydrocarbon process oil (Sunpar 2280), the other did not. The compositions were prepared in a Banbury according to the preferred procedure in which the black and optional oil are first blended with the EPDM before further blending with polypropylene.

TABLE VI

| Experiment No. | 1 (w/o oil) | 2 (with oil) |
|---|---|---|
| EPDM (1) pts | 70 | 70 |
| PP (2) pts | 30 | 30 |
| Atomite | 40 | 40 |
| Sunpar 2280 | | 20 |
| Tensile strength, psi | 1495 | 1040 |
| % Elongation | 185 | 510 |
| Flow in spiral mold, cm | 14 | 23 |

(1) $\overline{M}_n$ = 45,000 (membrane osmometry), ethylene content = 67 wt. %, and ENB content = 4.2 wt. %,
(2) Polypropylene having a melt flow of 5g/10 min. at 230° C and 2160g It is evident from the above experiment that a relatively low molecular weight EPDM is suitable for use in the elastomeric thermoplastics of the instant invention.

EXAMPLE 9

Polypropylene (5% n-heptane soluble, $\overline{M}_v$ = 70,000) was blended with (a) an EPDM having an $\overline{M}_n$ of about 190,000, an ethylene content of about 60 wt. % and an ENB content of about 5 wt. % and (b) Sunpar 2280. The weight ratios of the ingredients were 36.9/45.1/18.0 respectively. Blending was carried out in a Banbury mixer for 6 minutes such that the temperature of the blend was in excess of 170° C. at the end of the blending cycle.

The sample was injection molded at 200° C. and the following properties obtained:

| Shore D Hardness | 37 |
|---|---|
| Resiliency, Deg. | 19 |
| Flexural Modulus, psi | 23,000 |
| Tensile Strength | 1,340 |
| % Elongation | 275 |

The above data shows that the blend of this example is an elastomeric thermoplastic.

The sample was painted with a primer (Seibert Oxidermo) and a top coat of a flexible polyurethane enamel (Durethane 100) in white and blue color using standard techniques. The samples were then tested for paint adhesion, paint adhesion after water immersion, paint adhesion after salt water immersion and thermal cycling. In no case was there adhesion failure. In addition, weatherometer exposure showed no change in the paint surface attributable to the substrate.

EXAMPLE 10

The same ingredients and procedure for mixing as in Example 9 were used except the composition of the instant blend by weight is polypropylene 28.8, LS-HAF carbon black 28.8, ethylene propylene terpolymer 30.7, process oil 12.3.

The following physical properties were obtained:

| | |
|---|---|
| Shore D Hardness | 39 |
| Resiliency, Deg. | 21 |
| Flexural Modulus, psi | 21,500 |
| Tensile Strength, psi | 1,430 |
| % Elongation | 520 |

These results show the sample to be a thermoplastic elastomer. The sample was painted as in Example 1 and the same adhesion and weatherometer results were obtained.

Electron scanning microphoto graphs show that the crystalline polypropylene phase contains no carbon black.

EXAMPLE 11

Polypropylene is mixed in a Banbury as in Example 1 with 15 wt. % process oil. After injection molding, the surface of the polypropylene had a continuous film of oil and it was not possible to paint the sample. This example proves the need for a combination containing an amorphous ethylene propylene elastomer in combination with the oil.

EXAMPLE 12

Elastomeric compositions were prepared according to the following formulation:

| | Styrene | Mooney | Oil, phr |
|---|---|---|---|
| SBR 1502 | 23.5 | 52 | — |
| SBR 1703 | 23.5 | 60 | 25.0 |
| SBR 1713 | 23.5 | 52 | 50.0 |
| Formula: | | | |
| Elastomer and Oil | | 60.0 | |
| Polypropylene | | 40.0 | |
| Zinc stearate | | 0.3 | |
| Irganox 1010 | | 0.1 | |
| N774 Black | | 2.0 | |
| Polymer | EPDM[(1)] | EPDM[(2)] | SBR1502 |
| Spiral Mold Flow, cm. | 12.0 | 21.1 | 13.0 |
| Flex Set, ° at 5' | 28.0 | 19.0 | 30.0 |
| Secant Mod., psi | 33,750 | 25,500 | 40,160 |
| Tensile Strength, psi | 1570 | 1590 | 1860 |
| % Elongation | 260 | 590 | 180 |

[(1)]Mooney viscosity of 62 and an ethylene content of about 49 wt. %.
[(2)]Mooney viscosity of 40 and an ethylene content of about 70 wt. %.

p In the above, batches with oil extended SBR's 1703 and 1713 were too soft to handle in a Banbury. The polymers were abandoned when the batches in which they were used had to be scraped from Banbury chamber. The resulting mix, further, showed poor dispersion of the phases. This is in contrast to the two EPDM's above which contain 75 ph oil.

EXAMPLE 13

Elastomeric thermoplastic compositions were prepared according to the formulation set forth below:

In black systems, elastomer-oil-black masterbatches were combined with polypropylene using a 72.5/27.5 ratio.

| | EPDM1 | SBR1808 | EPDM2 | SBR1831 |
|---|---|---|---|---|
| Elastomer | 100.0 | 100.0 | 100.0 | 100.0 |
| Oil | 75.0 | 50.0 | 40.0 | 62.5 |
| Black | 131.0[(a)] | 75.0[(b)] | 75.0[(c)] | 82.5[(d)] |

The final formulation uses oil extended rubber as though it were all rubber:

| | EPDM1 | SBR1808* | EPDM2 | SBR1831** |
|---|---|---|---|---|
| Polymer | 60.0[(1)] | 70.0[(2)] | 60.0[(3)] | 70.0[(4)] |
| Oil | | | | |
| Black | 45.0[(a)] | 35.0[(b)] | 32.0[Black] | 30.5[(d)] |
| Polypropylene | 40.0 | 40.0 | 40.0 | 40.0 |
| Zinc stearate | 0.4 | 0.4 | 0.4 | 0.4 |
| Properties | | | | |
| Spiral Mold Flow, cm | 14.5 | 13.0 | 12.3 | 13.7 |
| Secant Mod., psi | 26,450 | 24,130 | 17,500 | 18,920 |
| Tensile Strength, psi | 2100 | 1615 | 1250 | 1580 |
| % Elongation | 750 | 310 | 230 | 330 |

[(1)]34 - EPDM - 26-Oil
[(2)]47 - SBR - 23-Oil   In parts per 100 parts of rubber
[(3)]43 - EPDM - 16-Oil
[(4)]50 - SBR - 31-Oil
[(a)]HAF-LS
[(b)]HAF
[(c)]GPF
[(d)]ISAF-HS
*In SBR1808 formulation:
63.5 SBR and Oil
36.5 Poly P
32.0 Black
**In SBR1831 formulation:
63.5 SBR and Oil
36.5 Poly P
28.0 Black This example shows that acceptable elastomeric thermoplastic compositions can be prepared with better extended SBR and oil.

What is claimed is:

1. A nonhomogeneous, gel-free, noncrosslinked elastomeric thermoplastic blend comprised of:
    (a) about 15 to 70 parts by weight of one or more $C_2$ to $C_8$ crystalline polyolefins having a crystallinity of more than 25 weight percent and a viscosity of about $1 \times 10^2$ to $1 \times 10^7$ poise at 225° C. at a shear rate of $10^2$ sec.$^{-1}$;
    (b) about 85 to 30 parts by weight of one or more gel-free, noncrosslinked elastomers having a viscosity, when measured at 225° C., higher than the viscosity of the crystalline polyolefin of (a) above and having a crystallinity less than about 25 weight percent; and
    (c) about 5 to 100 parts by weight of a hydrocarbon oil per 100 parts of elastomer and wherein said oil is selected from the group consisting of naphthenic and paraffinic oil.

2. The thermoplastic of claim 1 wherein the crystalline polyolefin is polypropylene.

3. The thermoplastic of claim 2 wherein the elastomer is EPDM.

4. A nonhomogeneous, gel-free, noncrosslinked elastomeric thermoplastic blend comprised of:
    (a) about 15 to 70 parts by weight of one or more $C_2$ to $C_8$ crystalline polyolefins having a crystallinity of more than 25 weight percent and a viscosity of about $1 \times 10^2$ to $1 \times 10^7$ poise at 225° C. at a shear rate of $10^2$ sec.$^{-1}$;
    (b) about 85 to 30 parts by weight of a copolymer of ethylene and at least one other $C_3$ to $C_{10}$ higher alpha olefin, or a terpolymer of ethylene, at least one other $C_3$ to $C_{10}$ higher alpha olefin and a $C_5$ to $C_{14}$ nonconjugated diolefin wherein said copolymer or terpolymer has a viscosity, when measured at 225° C., higher than the viscosity of the resin in (a) above and having a crystallinity less than about 25 weight percent; and (c) about 5 to 100 parts by weight of a hydrocarbon oil per 100 parts of ethylene copolymer or terpolymer and wherein said oil is selected from the group consisting of naphthenic and paraffinic oil.

5. The thermoplastic of claim 4 wherein the higher alpha olefin is propylene.

6. The thermoplastic of claim 4 wherein the nonconjugated diolefin is 5-ethylidene-2-norbornene.

7. The thermoplastic of claim 5 wherein the nonconjugated diolefin is 5-ethylene-2-norbornene.

8. The thermoplastic of claim 4 wherein the crystalline polyolefin is polypropylene.

9. The thermoplastic of claim 7 wherein the crystalline polyolefin is polypropylene.

10. The thermoplastic of claim 9 wherein the average molecular weight of the co- or terpolymer is about 120,000 to 160,000.

11. A nonhomogeneous, gel-free, noncrosslinked elastomeric thermoplastic blend comprised of:
(a) about 15 to 70 parts by weight of polypropylene having a crystallinity of more than 25 weight percent and a viscosity of about $1 \times 10^2$ to $1 \times 10^7$ poise at 225° C. at a shear rate of $10^2$ sec.$^{-1}$;
(b) about 85 to 30 parts by weight of EPDM having a viscosity, when measured at 225° C., higher than the viscosity of the polypropylene of (a) above and having a crystallinity less than about 25 weight percent; and
(c) about 5 to 100 parts by weight of a hydrocarbon oil per 100 parts of elastomer and wherein said oil is selected from the group consisting of naphthenic and paraffinic oil.

12. A nonhomogeneous, gel-free, noncrosslinked elastomeric thermoplastic blend comprised of:
(a) about 15 to 70 parts by weight of one or more $C_2$ to $C_8$ crystalline polyolefins having a crystallinity of more than 25 weight percent and a viscosity of about $1 \times 10^2$ to $1 \times 10^7$ poise at 225° C. at a shear rate of $10^2$ sec.$^{-1}$;
(b) about 85 to 30 parts by weight of one or more gel-free, noncrosslinked elastomers having a viscosity, when measured at 225° C., higher than the viscosity of the crystalline polyolefin of (a) above and having a crystallinity less than about 25 weight percent;
(c) about 5 to 150 parts by weight of a hydrocarbon oil per 100 parts of elastomer and wherein said oil is selected from the group consisting of naphthenic and paraffinic oil; and
(d) about 10 to 120 parts per 100 parts of elastomer of a carbon black having high reinforcing capacity and low aggregate structure.

13. The thermoplastic of claim 12 wherein the crystalline polyolefin is polypropylene.

14. The thermoplastic of claim 12 wherein the elastomer is EPDM.

15. The thermoplastic of claim 13 wherein the elastomer is EPDM.

16. A nonhomogeneous, gel-free, noncrosslinked elastomeric thermoplastic blend comprised of:
(a) about 15 to 70 parts by weight of one or more $C_2$ to $C_8$ crystalline polyolefins having a crystallinity of more than 25 weight percent and a viscosity of about $1 \times 10^2$ to $1 \times 10^7$ poise at 225° C. at a shear rate of $10^2$ sec.$^{-1}$;
(b) about 85 to 30 parts by weight of a copolymer of ethylene and at least one other $C_3$ to $C_{10}$ higher alpha olefin, or a terpolymer of ethylene, at least one other $C_3$ to $C_{10}$ higher alpha olefin and a $C_5$ to $C_{14}$ nonconjugated diolefin wherein said copolymer or terpolymer has a viscosity, when measured at 225° C., higher than the viscosity of the resin in (a) above and having a crystallinity less than about 25 weight percent;
(c) about 5 to 100 parts by weight of a hydrocarbon oil per 100 parts of ethylene copolymer or terpolymer and wherein said oil is selected from the group consisting of naphthenic and paraffinic oil; and
(d) about 10 to 120 parts per 100 parts of co- or terpolymer of a carbon black having high reinforcing capacity and low aggregate structure.

17. The thermoplastic of claim 16 wherein the higher alpha olefin is propylene.

18. The thermoplastic of claim 16 wherein the nonconjugated diolefin is 5-ethylidene-2-norbornene.

19. The thermoplastic of claim 17 wherein the nonconjugated diolefin is 5-ethylene-2-norbornene.

20. The thermoplastic of claim 16 wherein the crystalline polyolefin is polypropylene.

21. The thermoplastic of claim 19 wherein the crystalline polyolefin is polypropylene.

22. The thermoplastic of claim 21 wherein the average molecular weight of the co- or terpolymer is about 120,000 to 160,000.

23. A nonhomogeneous, gel-free, noncrosslinked elastomeric thermoplastic blend comprised of:
(a) about 15 to 70 parts by weight of polypropylene having a crystazlinity of more than 25 weight percent and a viscosity of about $1 \times 10^2$ to $1 \times 10^7$ poise at 225° C. at a shear rate of $10^2$ sec.$^{-1}$;
(b) about 85 to 30 parts by weight of EPDM having a viscosity, when measured at 225° C., higher than the viscosity of the polypropylene of (a) above and having a crystallinity less than about 25 weight percent;
(c) about 5 to 100 parts by weight of a hydrocarbon oil per 100 parts of elastomer and wherein said oil is selected from the group consisting of naphthenic and paraffinic oil; and
(d) about 10 to 120 parts per 100 parts of EPDM of a carbon black having high reinforcing capacity and low aggregate structure.

* * * * *